Figure 1:
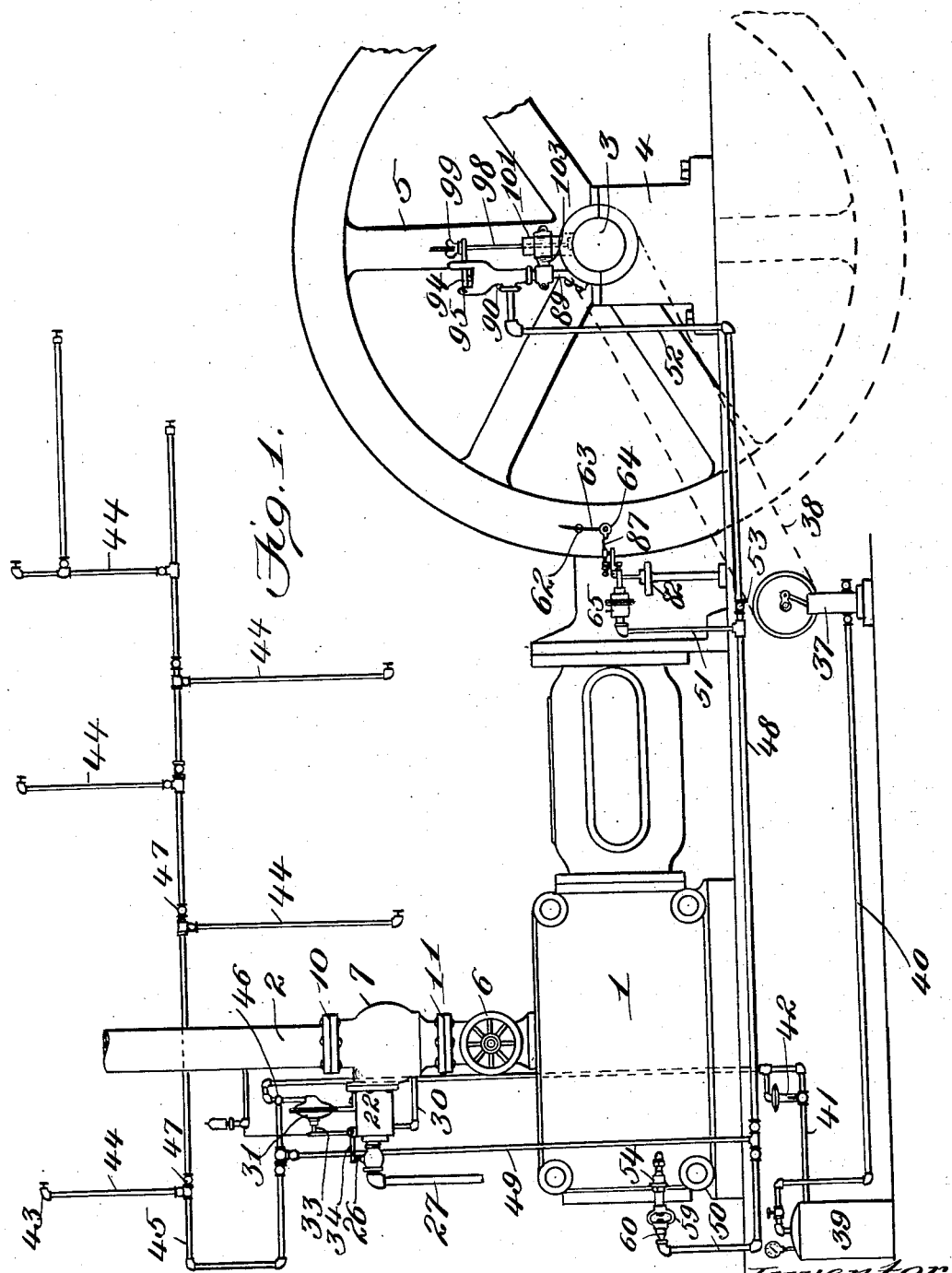

No. 855,414. PATENTED MAY 28, 1907.
H. R. ROCKWELL.
FLUID PRESSURE OPERATED STOP VALVE MECHANISM FOR ENGINES.
APPLICATION FILED OCT. 17, 1906.

3 SHEETS—SHEET 2.

Witnesses:
C. L. Kesler

Inventor
Hubert R. Rockwell
By
James L. Norris
Atty.

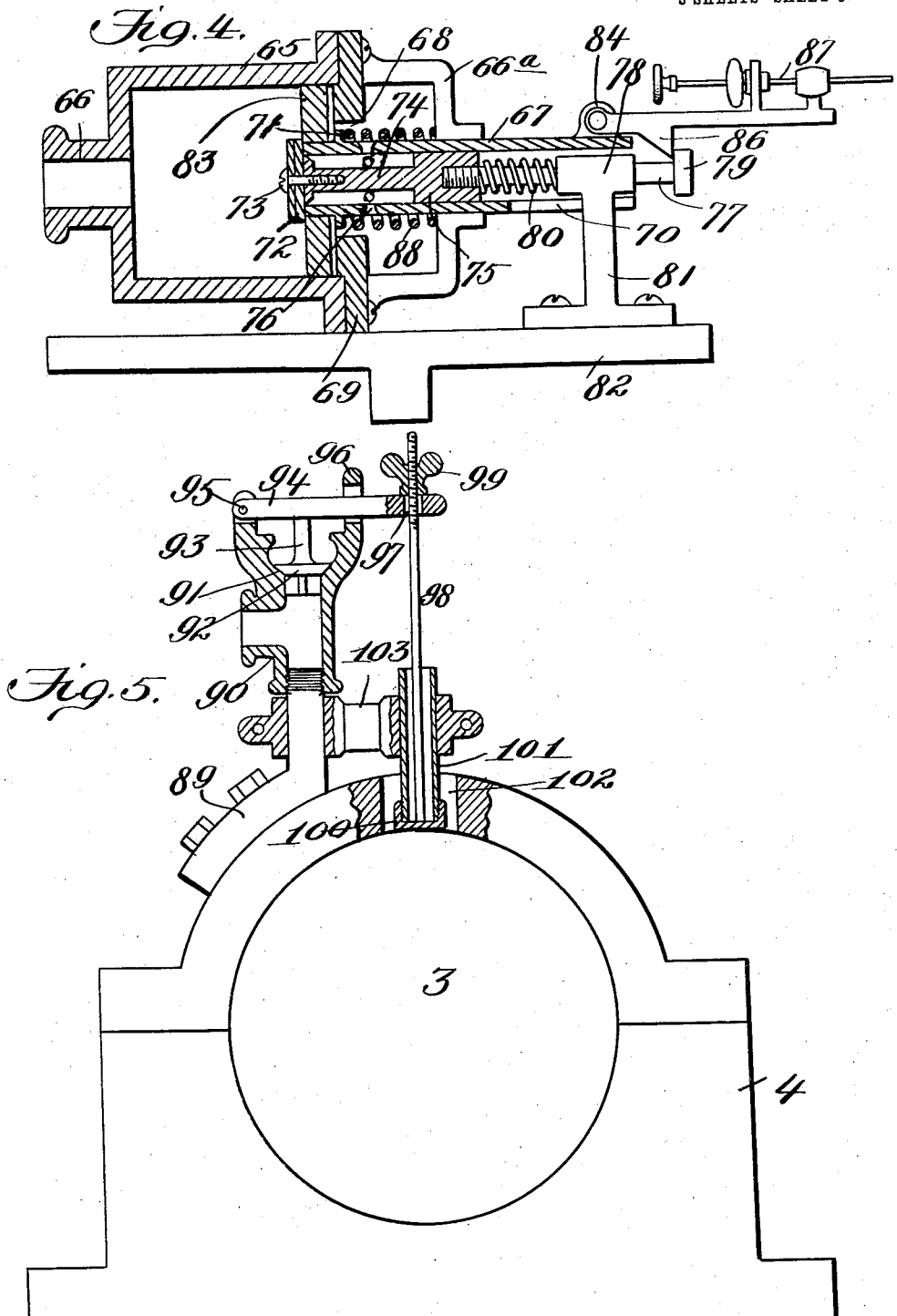

UNITED STATES PATENT OFFICE.

HUBERT R. ROCKWELL, OF CHATTANOOGA, TENNESSEE, ASSIGNOR OF ONE-THIRD TO JOSHUA C. WALL, JR., AND ONE-THIRD TO HENRY F. TEMPLE, BOTH OF CHATTANOOGA, TENNESSEE.

FLUID-PRESSURE-OPERATED STOP-VALVE MECHANISM FOR ENGINES.

No. 855,414.

Specification of Letters Patent.

Patented May 28, 1907.

Application filed October 17, 1906. Serial No. 339,398.

*To all whom it may concern:*

Be it known that I, HUBERT R. ROCKWELL, a citizen of the United States, residing at Chattanooga, in the county of Hamilton and State of Tennessee, have invented new and useful Improvements in Fluid-Pressure-Operated Stop-Valve Mechanism for Engines, of which the following is a specification.

This invention relates to a fluid pressure operated stop valve mechanism for engines, and aims to provide in a manner as hereinafter set forth, a mechanism of such class embodying a valvular member and means arranged in operative relation with respect to the valve for operating it to close the same, thereby discontinuing the operation of the engine, when the engine exceeds a certain speed limit, when the bearings become hot and when the cylinder is to be relieved from the water of condensation; furthermore, to provide in a manner as hereinafter set forth, a manually-operated means which when operated will cause the shifting of the valve to close the steam supply so as to stop the engine when it is desired.

The invention further aims to provide a fluid pressure operated pneumatic stop valve and means for operating it for the purposes hereinbefore set forth, said valve and means being simple in construction and arrangement, strong, durable, efficient in use, and readily set up with respect to the parts of the engine with which it associates.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, wherein like reference characters denote corresponding parts throughout the several views—

Figure 2:
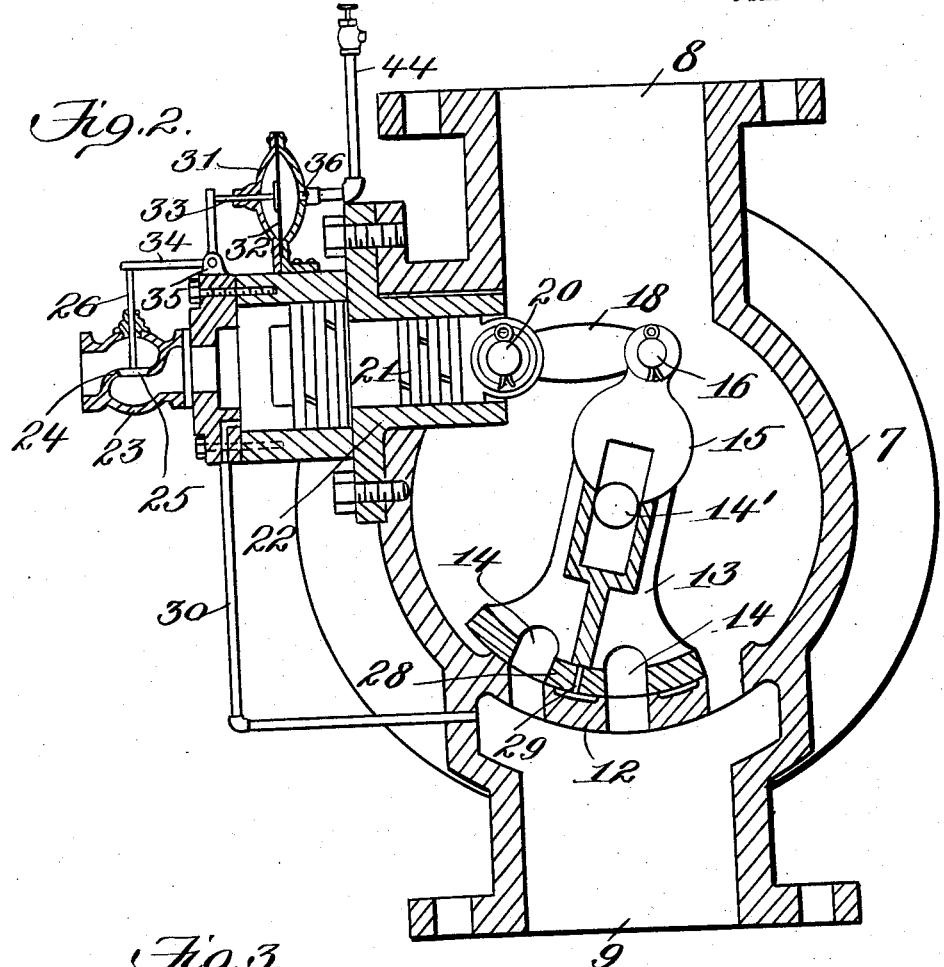
Figure 3:
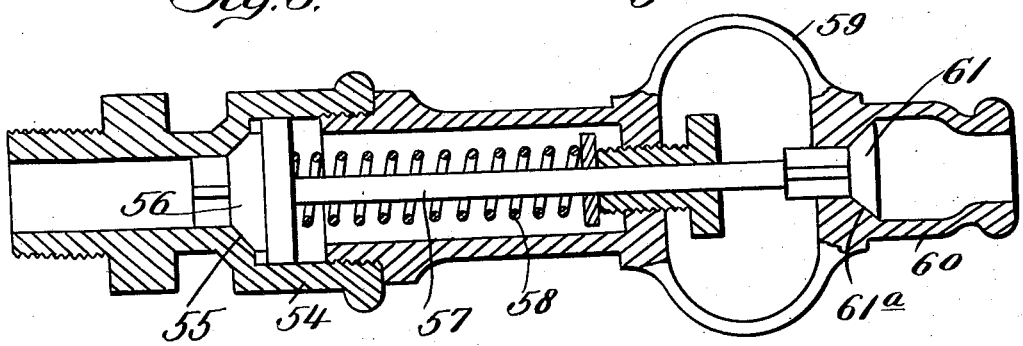

Figure 1 is a side elevation. Fig. 2 is a sectional view of the stop valve. Fig. 3 is a like view of the cylinder relief valve. Fig. 4 is a like view of the speed limit trip mechanism for causing the operation of the stop valve. Fig. 5 is a like view of the mechanism for operating the stop valve when the bearings become hot.

Briefly described the invention comprises fluid pressure operated pneumatic stop valve for closing the admission of steam to the cylinder, manually-operated means associating with the valve for causing the operation thereof when occasion so requires, and automatically-operable means associating with the valve and operated from the fly wheel of the engine when the speed limit is exceeded, the valve when operated closing the supply of steam and discontinuing the operation of the engine; an automatically-operable means associating with the valve for operating it when the bearings become hot, the valve when operated being shifted to close the steam supply, consequently stopping the engine, and an automatically-operable relief means for the cylinder and which associates with the valve and is adapted to operate the valve for shutting off the supply of steam so that the engine will be stopped and the cylinder cleaned of the water of condensation.

The invention further comprises an air compressor operated from the crank shaft of the engine and which communicates with an air reservoir, the latter communicating with the regulating means associating with the valve and interposed in the communication between the reservoir and the regulator is a reducing valve.

Referring to the drawings by reference characters 1 denotes the cylinder of the engine, 2 the steam supply conduit, 3 the crank shaft, 4 the bearings therefor, 5 the fly-wheel and 6 the throttle. The foregoing elements may be of known construction.

The stop valve comprises a casing 7 having an inlet 8 and an outlet 9. The inlet 8 of the casing 7 is secured to the conduit 2 by the union 10 and the outlet 9 is secured to the throttle valve casing by the union 11. The casing 7 is formed with an internally-arranged slotted web 12, which is an integral part of the casing and forms a valve seat for an oscillatory valvular member 13. This member 13 is somewhat in the form of a quadrant and is notched, as at 14, said notches alining when the valve is in certain positions with the slots through the web 12. These latter slots also act as means for establishing communication between the upper part of the valve chamber 7 and the outlet 9 when the valvular member 13 is shifted so as to open one or more of the said slots of the member 12. The valvular member 13 is pivoted, as at 14', and is formed with an extension 15 pivotally connected, as at 16, to a link 18, the latter being pivotally connected, as at 20, to a differential piston 21 operating in an extension 22 which forms a part of the valve chamber 7 and which also communicates with an exhaust valve casing 23, the latter provided with a seat 24 which is engaged by an automatically-operable exhaust valve 25, the latter being provided with a stem 26 which projects from the casing 23 and is engaged by an operating mechanism therefor to be hereinafter referred to. An outlet pipe 27 communicates with the valve casing 23 for carrying off the exhaust steam. The valvular member 13 at its bottom is provided with a laterally-extending flange 28 having a port therethrough, as at 29. A pipe branch 30 opens into the chamber 7 below the member 12 and in the extension 22 at the rear of the differential piston 21, the function of which will be hereinafter referred to. The valve 25 is moved from its seat so as to allow the exhaust of steam from the extension 22 so that the valvular member 13 can be shifted in one direction to close the slots in the member 12, through the medium of a fluid-pressure regulator, such regulator when pressure is exhausted therefrom shifting the valve 25 through an intermediate mechanism so that the valve 25 will be moved from its seat. Pressure is exhausted from the regulator in a manual manner, automatically when the engine exceeds a certain speed limit, automatically when the bearings become hot and automatically when it is necessary to relieve the cylinder 1 of the water of condensation. The said manual means for relieving the pressure from the regulator and the said automatic means will be hereinafter referred to.

The pressure regulator comprises a casing 31 in which is arranged a flexible diaphragm 32 having connected thereto a stem 33 which is attached to a bell crank 34 supported, as at 35, one arm of the bell crank being attached to the stem 33 and the other arm to the stem 26. An inlet 36 for the supply and exhaust of pressure in the casing 31 is provided. When pressure is applied to the diaphragm 32 the valve 25 is held against its seat, but when pressure is released from the diaphragm the valve will be enabled to be removed from its seat owing to the steam pressure in the extension 22 and the action of the diaphragm 32 and under such conditions the steam can exhaust from the extension 22 so that pressure within the casing 7 will tend to shift the differential piston 21 and consequently move the valvular member 13 to closing position.

A means is provided for supplying fluid pressure to the regulator, said means consisting of an air compressor 37 operated through the medium of a belt connection 38 from the crank shaft 3 of the engine and the cylinder of the compressor communicates with a reservoir 39 through the medium of the discharge pipe 40. A small pipe 41, which constitutes a supply pipe for the pressure regulator, leads from the reservoir 39 to the port 36 and said supply pipe 41 has interposed therein a reducing valve 42 of known construction.

The manual means for relieving the pressure from the diaphragm 32 within the casing 31 consists of an exhaust valve 43 at one end of a pipe branch 44 which communicates with a distributing pipe 45, the latter opening into the supply pipe 41, as at 46. The distributing pipe 45 is provided with a plurality of branch pipes 44, each having an exhaust valve 43 so that the manual operation of relieving pressure from the regulator can be had at various points. The distributing pipe 45 in close proximity to the coupling between said pipe 45 and branch pipes 44 is provided with a plurality of check valves 47 so that air is discharged only through a direct pipe from back of the diaphragm 32 to that valve 43 which is opened. Such action economizes in the use of air and also renders quick action.

A second distributing pipe 48 is provided which communicates through the medium of the pipe branch 49 with the distributing pipe 45. The distributing pipe 48 communicates, respectively, with the means for causing the operation of the valvular member 13 when it is desired to relieve the cylinder of water pressure, with the means for automatically operating the valvular member 13 when the engine exceeds a certain speed limit and with the means for operating the valvular member 13 when the bearings become hot through the medium of the branch pipes 50, 51 and 52.

The branch pipe 49 and the distributing pipe 48 are provided with check valves 53 utilized for the same function as the check valves 47. The means for closing the operation of the valvular member 13 when it is desired to relieve the cylinder of water comprises a relief valve mechanism consisting of a casing 54, which connects with the indicator pipe of the cylinder and which is provided with a valve seat 55, against which is normally seated a valve 56, having a stem 57 surrounded by a coiled spring 58. The casing 54 carries a yoke 59 which terminates in a cylindrical extension 60 coupled to the pipe 50. The extension 60 constitutes an exhaust valve casing and is provided with an exhaust valve 61 adapted to engage the seat 61ᵃ. The valve 61 is connected to the stem 57 which extends through the yoke 59 and into the casing 60. The water in the cylinder will cause the valve 56 to rise from its seat against the tension of the spring 58. The valve stem 57 will then shift the valve 61 off its seat, thereby opening the casing 60 through the yoke 59 to the atmosphere and relieving pressure from the regulator, and such action will cause the unseating of the valve 25. The steam in the extension 22 will then be exhausted and the pressure in the casing 7 will operate upon the differential piston so as to move it outwardly and cause the shifting of the valvular member 13 to close the slots in the member 12.

The means for causing an automatic operation of the valvular member 13 when the engine exceeds the speed limit comprises a split stud 62 secured to the fly-wheel 5 and which carries a spring member 63 having a weight 64 at one end which is adapted, through means of centrifugal force when the engine exceeds the speed limit, to engage and operate the exhaust valve mechanism which communicates with the upper end of the branch pipe 51. The exhaust valve mechanism consists of a casing 65, which communicates, as at 66, with the top of the branch pipe 51. Projecting forwardly from the casing 65 is a spider 66ᵃ, which supports a cylinder 67, the latter extending into the casing 65 through an opening 68 in the head 69 of said casing, the opening 68 being of much greater diameter than the cylinder 67. The cylinder 67 is slotted, as at 70, and also provided with a peripheral flange, as at 71. The function of the slots 70 and the flange 71 will be hereinafter referred to.

The cylinder 67 carries a trip valve consisting of a pair of disks 72 secured by the hold-fast device 73 to a shank 74, the latter terminating in a head 75. The disks 72 are arranged at the rear of the cylinder 67 exteriorly thereof and of much greater diameter. The shank 74 is of much less diameter than the cylinder 67 so as not to interfere with the exhaust of air out of the ports 76 which are formed in the cylinder 67.

Connected to the head 75 is a valve stem 77, which extends through a guide sleeve 78 and carries on its free end a head 79 and interposed between the sleeve 78 and the head 75 and surrounding the stem 77 is a coiled compression spring 80. The sleeve 78 is carried by an arm 81, which extends through the slots 70 and is secured to a support 82. Mounted upon the inner end of the cylinder 67 and operating within the casing 65 is a piston 83 which is retained in position by the disks 72. Pivoted to a bracket 84 at the outer end of the cylinder 67 is a trip arm 85 having a nose 86 which is adapted to engage the head 79 of the stem 77 and hold the disks 72 in close contact with the inner end of the cylinder 67, thereby closing it. The arm 85 carries an adjustable rod 87, which is positioned in the path of the weight 64 so that when the weight 64 engages the arm 87 it will shift the arm 85 on its pivot and move the nose 86 out of engagement with the head 79 which will release the spring 80, the expansion thereof causing the disks 72 to be moved away from the inner end of the cylinder 67 and allow the air to exhaust from within the casing 65 into the cylinder 67 and out through the ports 76. Surrounding the cylinder 67 and interposed between the flange 71 and the spider 66 is a coiled compression spring 88, the function of which is to move the cylinder 67 inwardly when pressure is relieved in the casing 65. Providing the cylinder with the slots 70 permits of such movement, the inward movement of the cylinder 67 being arrested by the head 79 engaging the sleeve 78.

Owing to the adjustability of the rod 87 it can be positioned at various points so as to provide for various speed limits of the engine. When the weight 64 trips the arm 85 so as to release the disks 72 pressure will be exhausted from the pressure regulator and consequently the valvular member 13 can be shifted so as to close the slots in the member 12.

The automatic means for causing the shifting of the valvular member 13 when the bearings become hot, comprises a supporting arm 89 carried by a fixed part of the engine, to which is attached an exhaust valve mechanism consisting of a casing 90 to which is attached the upper end of the branch pipe 52. The casing 90 is formed with a valve seat 91 for the valvular member 92, the latter having a stem 93 which is connected to a lever 94 pivoted at 95 to the casing 90, and extending through an apertured arm 96 carried by said casing. The free end of the lever 94 is apertured as at 97 and through said aperture extends a holding-down rod 98 carrying on one end a stop nut 99 which engages the lever 94 and at its other end is soldered to a cap 100, the solder being such as will melt at a much lower temperature than Babbitt metal. The cap 100 is carried on the lower end of the tube 101, which extends down through an opening 102 in the journal cap and which also extends through a guide 103 projecting from the supporting arm 89. When the bearing becomes hot the solder which connects the rod 98 to the cap 100 will melt, which releases the rod and consequently also releases the valve 92 so that there will be nothing to hold the valve 92 to its seat, so therefore the pressure within the casing 90 will unseat the valve and allow an exhaust to the atmosphere from the branch pipe 51. Such action will release the pressure upon the diaphragm of the regulator and cause the shifting of the valvular member 13 in a manner as hereinbefore stated. The movement in one direction of the lever 94 is arrested by the upper wall of the opening in the arm 96.

It will be apparent from the foregoing description, taken in connection with the accompanying drawings, that if any one of the exhaust valves 43 is operated manually it will cause in a manner as hereinbefore stated, the shifting of the valvular member so as to close the steam supply, thereby discontinuing the operation of the engine.

It will be furthermore evident that when water within the cylinder 1 will cause the shifting of the valve 56 the latter in turn will operate the exhaust valve 61, thereby opening the pipe 50 to the atmosphere and cause the automatic shifting of the valvular member 13 to closing position, thereby discontinuing the steam supply and the operation of the engine.

It will furthermore be apparent that if the engine exceeds the speed limit the pipe branch 51 will be opened to the atmosphere, thereby relieving pressure upon the diaphragm of the regulator and consequently cause the automatic shifting of the valvular member 13 to closing position and such action will cut off the steam supply and discontinue the operation of the engine, and the same action is had when the bearing becomes hot, which will cause the release of the rod 98, thereby permitting the valve 92 to be shifted from its seat and allowing the pressure to exhaust from the pipe branch 52 and such action will relieve the pressure upon the diaphragm of the regulator and cause the automatic shifting of the valvular member 13 to closing position for the purpose set forth.

The exhaust valves 43 which are manually operated to open position are automatically operated to closure position owing to the employment of suitable compression springs which, when such valves are open, compress, and when the valves are released the springs expand, consequently moving the valves to closure position. As this is an obvious construction it is thought unnecessary to show it.

When the exhaust valves 43 are released so they can close, the air from the reservoir 39 will flow up through the supply pipe 41 and shift the diaphragm 32, which in turn will cause the closing of the valve 25 thereby shutting off the exhaust of steam from the extension 22. Now if the throttle valve 6 is closed the steam will pass through the port 29 to the lower part of the casing 7 and from there through the branch pipe 30 to the extension 22 back of the differential piston 34 which will create pressure on the large end of the piston 34 and cause the same to move inwardly, thereby shifting the member 13 to open position. The same action takes place when the exhaust valve mechanisms for each of the pipe branches 50, 51 and 52 are closed.

What I claim is—

1. A fluid pressure operated stop valve mechanism for engines comprising an oscillatory valvular member mounted in a steam supply and shiftable from and to open position by fluid pressure, a shiftable element operated by steam pressure and connected to said valve for normally retaining said valve in open position, a fluid pressure operated means for causing an exhaust of steam thereby allowing of the shifting of said element in one direction by steam pressure, causing thereby the moving of said valve to closing position, and means for automatically supplying a pressure of steam against said element when the exhaust has been closed, causing thereby the shifting of said element in the opposite direction and the moving of said valve to open position.

2. A fluid pressure operated stop valve mechanism for engines comprising an oscillatory valvular member mounted in a steam supply, and shiftable from and to open position, a normally-closed steam exhaust, a shiftable element impacted upon by the incoming steam and connected to said valve for normally retaining said valve in open position, a fluid pressure operated means for opening the steam exhaust to allow of the shifting of said element in one direction by the incoming steam, causing thereby the moving of said valve to open position, and means for automatically supplying a pressure of steam against said element when the exhaust has been closed, causing thereby the shifting of said element in the opposite direction and the moving of said valve to open position.

3. A fluid pressure operated stop valve mechanism for engines comprising a valvular member shiftable from and to open position for closing and opening the steam supply, a normally closed steam exhaust, a shiftable element operated by steam pressure and connected to said valve for normally retaining said valve in open position, means communicating with an air supply for normally retaining the steam exhaust closed, means for exhausting the air thereby permitting of the opening of the steam exhaust and the exhaust of steam to allow of the shifting of said element in one direction by the incoming steam, causing thereby the moving of said valve to closing position, and means for automatically supplying a pressure of steam against said element when the exhaust has been closed, causing thereby the shifting of said element in the opposite direction and the moving of said valve to open position.

4. A fluid pressure operated stop valve mechanism for engines comprising a valvular member shiftable to and from closing position for opening and closing the steam supply, a differential piston connected to said valve for shifting it, means for applying steam pressure to one end of said piston for normally retaining the valve open, a steam exhaust valve mechanism, means communicating with an air supply for retaining said exhaust valve mechanism normally in position, means for exhausting the air, thereby releasing said exhaust valve mechanism and permitting the steam to exhaust and the shifting of the valvular member to closing position, and means when the exhaust of air is discontinued to cause the application of steam pressure against said piston thereby moving the valvular member to open position.

5. A fluid pressure operated stop valve mechanism for engines comprising a valvular member shiftable to and from closing position for opening and closing the steam supply, a differential piston connected to said valve for shifting it, means for applying steam pressure to one end of said piston for normally retaining the valve open, a steam exhaust valve mechanism, means communicating with an air supply for retaining said exhaust valve mechanism normally in closed position, and means for exhausting the air thereby releasing said exhaust valve mechanism and permitting the steam to exhaust and the shifting of the valvular member to closing position.

In testimony whereof I have hereunto set my hand in presence of two subscribing witnesses.

HUBERT R. ROCKWELL.

Witnesses:
EDGAR McKENNEY,
EDWARD CLARK.